United States Patent [19]

Ehrenfried et al.

[11] 3,783,689
[45] Jan. 8, 1974

[54] DISCRETE LEVEL DETECTOR

[75] Inventors: Albert D. Ehrenfried; Norton T. Pierce, both of Concord, Mass.

[73] Assignee: Metritape, Inc., West Concord, Mass.

[22] Filed: Mar. 24, 1970

[21] Appl. No.: 22,204

[52] U.S. Cl. ............... 73/301, 200/61.21, 200/85 R, 340/246
[51] Int. Cl. ........................................... G01f 23/18
[58] Field of Search ..................... 73/301; 200/61.2, 200/61.21, 85; 340/244, 246

[56] References Cited
UNITED STATES PATENTS
3,583,221   6/1971   Ehrenfried ........................ 73/301
3,153,342   10/1964  Pierce .............................. 73/301
3,550,447   12/1970  Beresic ........................ 200/61.21

FOREIGN PATENTS OR APPLICATIONS
825,007   2/1938   France .............................. 73/301

Primary Examiner—Louis J. Capozi
Assistant Examiner—Denis E. Corr
Attorney—Joseph Weingarten

[57] ABSTRACT

A level indicator for indicating the presence or absence of a fluent material at a discrete position. An elongated sensing element is provided which is operative in the presence of surrounding pressure to actuate one or more redundant contacts integrally formed therewith and which is isolated from the working environment.

9 Claims, 10 Drawing Figures

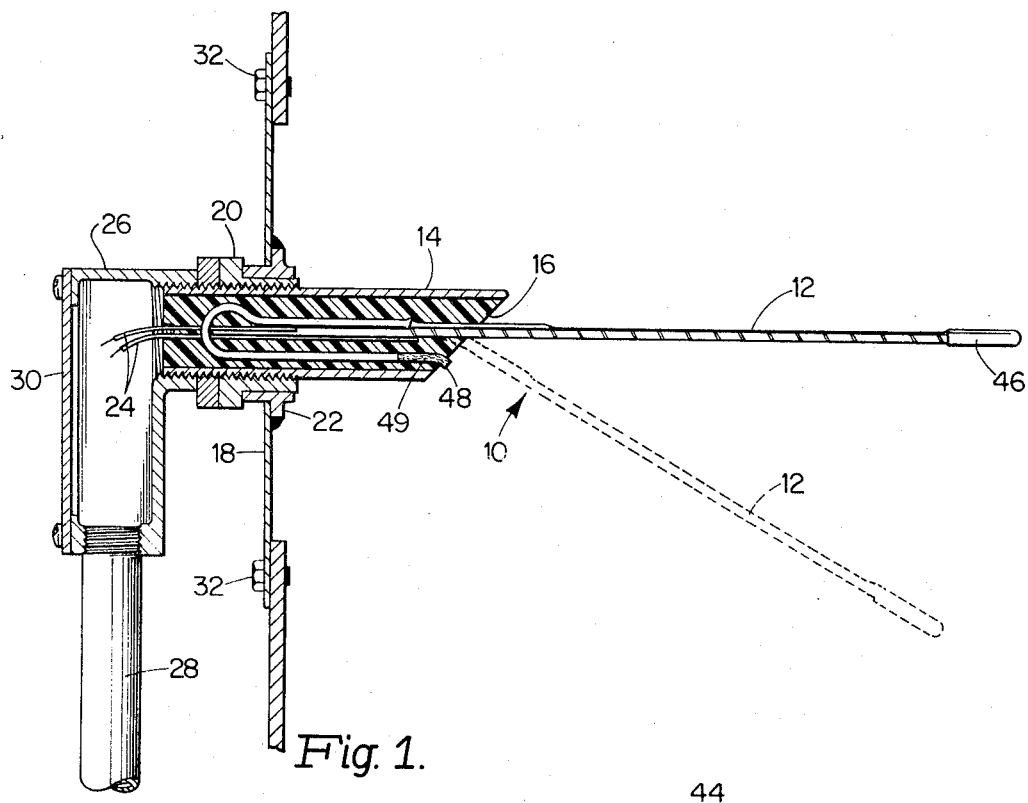
Fig. 1.
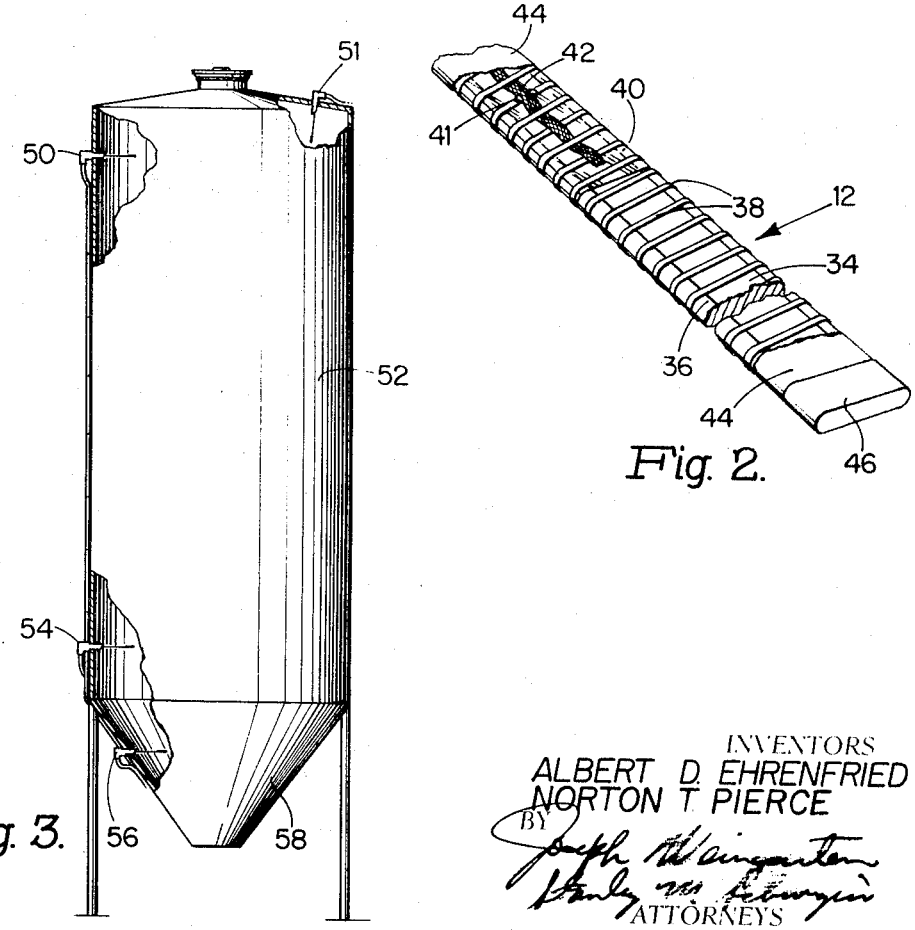
Fig. 2.
Fig. 3.
INVENTORS
ALBERT D. EHRENFRIED
NORTON T. PIERCE
BY
ATTORNEYS

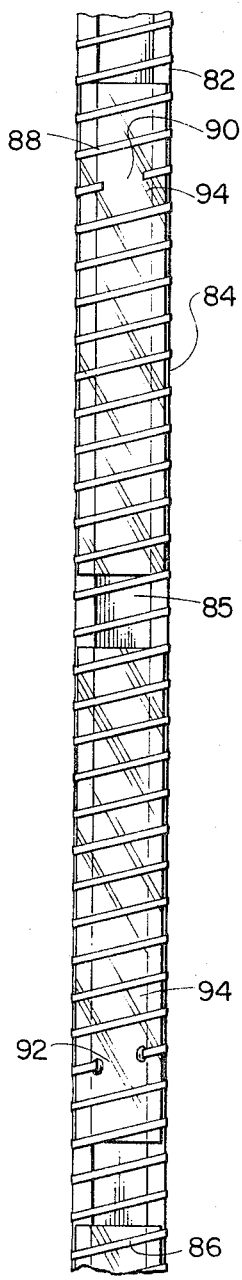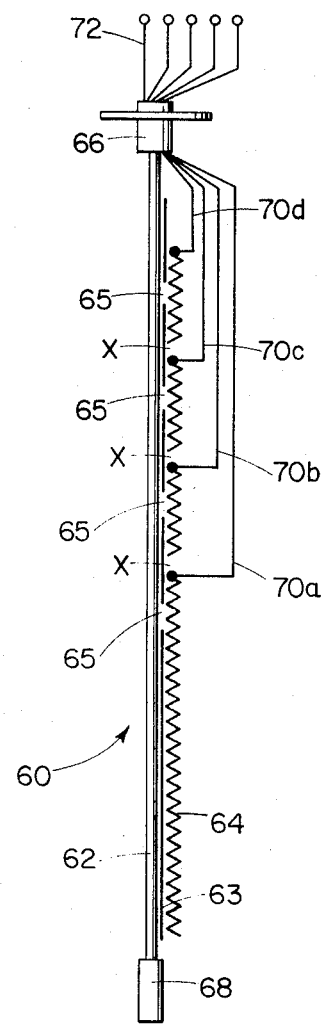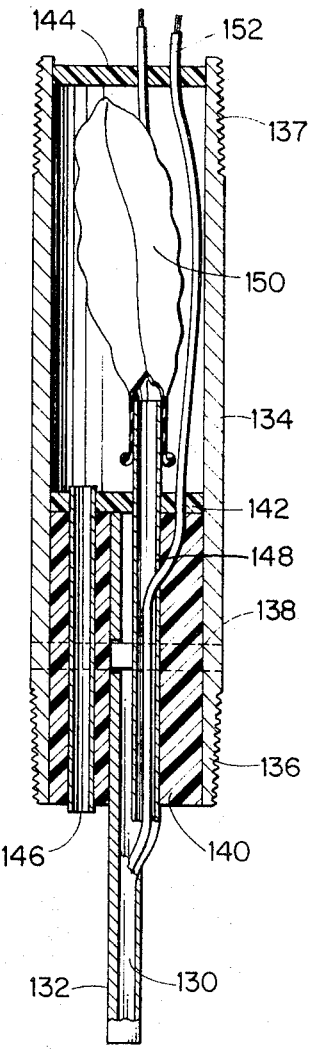

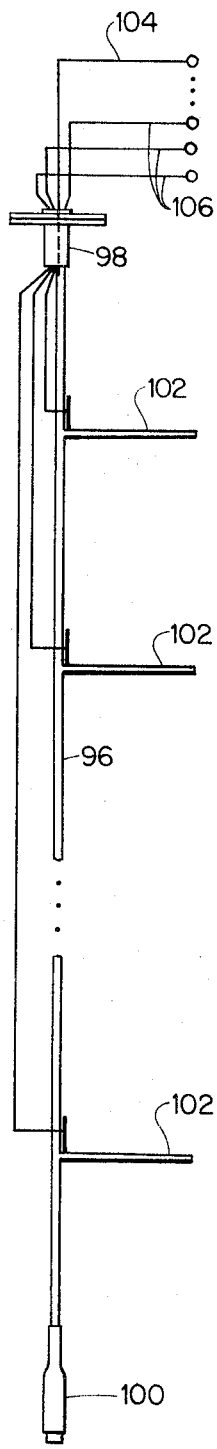
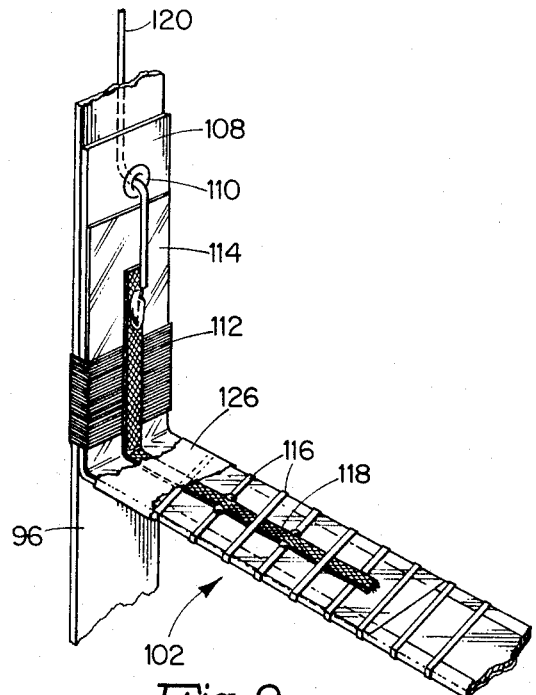
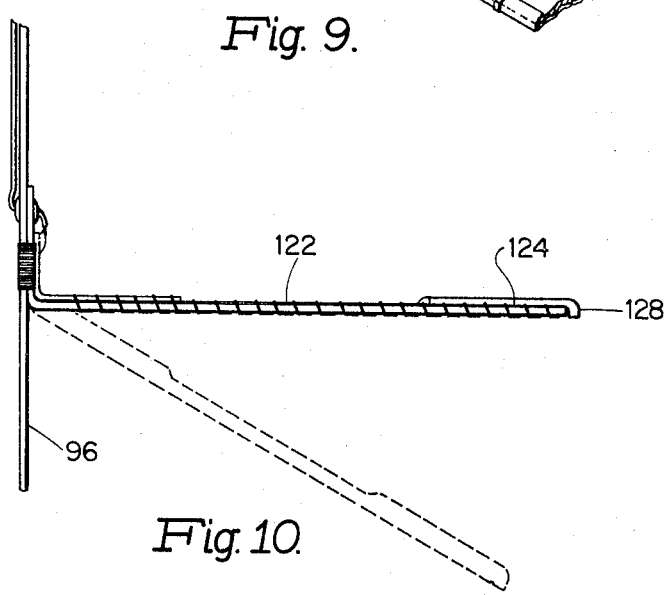
Fig. 8.
Fig. 9.
Fig. 10.
INVENTORS
ALBERT D. EHRENFRIED
NORTON T. PIERCE

DISCRETE LEVEL DETECTOR

FIELD OF THE INVENTION

This invention relates to level detectors and more particularly to discrete level detectors which are electrically sensitive to surrounding pressure of a fluent material and which are isolated from the working environment.

BACKGROUND OF THE INVENTION

Discrete level sensing devices capable of detecting the presence or absence of fluent material at a selected position are widely employed in the measurement and control of materials stored in bins, silos or other suitable vessels. Such level detectors are employed, for example, to control filling and draining operations of dry bulk or liquid material in a storage vessel, one such detector being placed at the top of the vessel to indicate a high level condition, and another detector being placed at the bottom of the storage vessel to indicate a low level condition. Discrete level detectors of conventional construction suffer a number of deficiencies which seriously limit their usefulness in many operating environments. For use in liquid materials, a float actuated switch is often employed. However, such float mechanisms often stick due to corrosion and material build-up, especially in slurries and sewage, which limits the utility of such devices.

Capacitance probes and photoelectric sensors have been employed in both liquid and dry solid materials for level indication. Capacitance sensors are usually difficult to maintain in adjustment and are subject to drift with passage of time. In addition, deposits of material on a capacitance probe will falsely indicate the presence of material. In like manner photoelectric devices are affected by the build-up or deposit of residue and require continual cleaning and maintenance to maintain proper system operation.

To indicate discrete level in dry granular solids, a known sensor employs a rotating paddle wheel which is free to rotate when material is absent, but which is prevented from rotation in the presence of material surrounding the paddle. Such rotatable paddles are commonly mounted in the side wall of the bin or other storage vessel. As material is withdrawn from the bin, a shearing action takes place between the mass of material and the wall of the bin, and shearing forces of considerable magnitude can occur with resulting damage or destruction to the sensing element. Capacitance probes and photoelectric devices similarly suffer the damaging effects of such shearing forces. A further disadvantage of paddle type indicators is that they require a rotating shaft to be mounted through the wall of the storage vessel. Dust and other contaminants can penetrate the bearings and effect the electrical operation of such indicators or increase bearing friction to the point of preventing paddle rotation and thereby preventing proper level indication.

Discrete level indicators of conventional design are generally mechanically rigid in order to withstand the often considerable forces experienced in an operating environment. The construction of such conventional indicators required to maintain a structurally sound device often detracts from the electrical sensitivity of such devices, and attempts to increase the electrical sensitivity thereof usually result in loss of mechanical strength. In addition, conventional indicators are not easily sealed or isolated from the working environment, as a result of which such indicators are sensitive to contamination, such as dust or moisture, from the environment. Moreover, many conventional level indicators require ancillary linkages to couple the sensing element to the stored material being sensed. Such linkages can limit the accuracy of level determination and can become clogged with the material in which they must operate.

SUMMARY OF THE INVENTION

In accordance with the present invention, an electrically sensitive and mechanically rugged discrete level detector is provided which is electrically isolated from the environment and which is capable of actuation at different points along its length. The novel detector includes a plurality of electrically parallel redundant contacts which can be provided by a continuous manufacturing process to provide sensors of various lengths and which can be employed to provide multiple zone systems for the discrete indication of material level by means of a single sensor structure. The detector constructed according to the invention essentially has no moving parts and requires no additional structure or linkages to provide actuation. Actuation of the novel detector is provided by the force of the material being sensed.

The detector can be easily mounted on the side wall of a storage vessel in a horizontal or inclined disposition, or can be mounted in vertical disposition from the top wall thereof to provide an elongated discrete level indicator which can provide one or more zones of level indication. In a horizontal or inclined orientation, the detector can be extremely resilient and is capable of withstanding shearing forces often encountered during filling or removal of material from a storage vessel. The detector can be completely sealed from its environment, with the result that contamination does not affect electrical operation. Electrical connection to the detector is greatly simplified over conventional detectors in that only a two-wire connection need be made thereto.

The detector can also be mounted in a channel which serves to protect the detector from forces of the material mass in which it is employed, especially in those environments where the forces can be extreme. Such a mounting channel also serves to maintain the detector position in agitated or turbulant materials without detracting from its electrical sensitivity.

In brief, the level detector according to the invention comprises an elongated electrically conductive base strip having an insulating layer partially surrounding the base strip and insulating the strip except for an exposed portion along the length of one surface thereof. An electrically conductive wire is helically wound around the base strip and insulation, the wire being spaced from the exposed portion of the base strip by operation of the portions of the insulating layer running lengthwise of the base strip and defining the exposed portion. The helically wound wire thus bridges the exposed portion of the base strip and remains electrically insulated therefrom except when an external force is applied to the detector.

A jacket, which may include one or more layers of material to provide moisture and abrasion resistance as required, can be employed to cover the entire sensor and to seal the electrical system from the operating environment. The conductive base strip serves as one electrical terminal of the sensor while the helically wound conductive wire serves as the other electrical terminal thereof. Each turn of the helical wire bridging the exposed portion of the base strip serves as a switch contact, and it will be appreciated that the plurality of helical turns provides redundant, electrically parallel contacts, each of which is operative to respond to an applied force to contact the underlying base strip and actuate the novel sensor. The detector is connected to suitable utilization circuitry which can provide output indications as required to suit particular operating requirements, or which can provide automatic control of filling or drainage operations.

DESCRIPTION OF THE DRAWINGS

The invention will be more fully understood from the following detailed description taken in conjunction with the accompanying drawings, in which:

FIG. 1 is an elevation view, partly in section, of a discrete level detector according to the invention;

FIG. 2 is a cut-away pictorial view, more particularly illustrating the sensor structure of FIG. 1;

FIG. 3 is a partly cut-away elevation view of a storage bin embodying the invention;

FIG. 4 is a sectional elevation view of an alternative embodiment of the invention;

FIG. 5 is a cut-away pictorial view of the sensing element of the embodiment of FIG. 4;

FIG. 6 is a diagrammatic view of a multiple zone discrete detector according to the invention;

FIG. 7 is a cut-away elevation view further illustrating the multiple zone embodiment of FIG. 6;

FIG. 8 is a diagrammatic view of an alternative multiple zone detector according to the invention;

FIG. 9 is a cut-away pictorial view illustrating a sensing element of the embodiment of FIG. 9; and FIG. 10 is a cut-away elevation view of a sensing element of the embodiment of FIG. 9.

DETAILED DESCRIPTION OF THE INVENTION

A discrete level detector embodying the invention is illustrated in FIG. 1 and is shown mounted to the wall of a storage bin or other suitable storage vessel adapted to contain material, the level of which is to be monitored. The detector 10 includes an elongated sensing element 12 of flat tape-like configuration and operative in the presence of an applied force to cause actuation of one or more of a plurality of electrically parallel redundant contacts provided along the length thereof, as will be described hereinafter. Sensing element 12 is supported at one end within a cylindrical mounting collar 14 for example by means of a suitable potting compound 16 such as epoxy provided within collar 14. Collar 14 is secured to a mounting plate 18 by means of threaded lock nut 20 cooperating with a threaded fitting 22 welded or otherwise attached to an opening provided in mounting plate 18.

A pair of electrical leads 24 connected to the redundant contacts of sensing element 12 extend from the sensing element through the mounting compound to a position for connection to utilization circuitry. In the illustrated embodiment, leads 24 are disposed within a connector box 26 of elbow configuration threaded at one end onto mounting collar 14 and threaded at the opposite end to an electrical conduit 28. The sensor leads can be easily channeled through conduit 28 to associated utilization circuitry. A cover plate 30 is removably attached to connector box 26 for access to leads 24. The discrete level detector 10 is disposed within the storage vessel through an opening provided in the wall thereof and, as illustrated, mounting plate 18 is secured to the wall of the storage vessel by machine screws 32 or other suitable fasteners.

The elongated sensing element 12 is best described with reference to FIGS. 1 and 2. The sensing element comprises an electrically conductive base strip 34 having an insulating layer 36 partially surrounding base strip 34 and insulating the strip except for an exposed portion along the length of one surface thereof. An electrically conductive wire 38 is helically wound around the base strip 34 and insulation 36, the helical turns of wire 38 being spaced from the exposed portion of base strip 34 by operation of the portions of insulating layer 36 extending lengthwise of the base strip and defining the exposed portion. The helically wound wire 38 thus remains electrically insulated from base strip 34 except in the presence of an external force applied to the sensor. In the presence of such force, one or more of the helical turns of wire 38 will be caused to contact the underlying portion of base strip 34 and provide electrical connection thereto and thereby cause actuation of the detector. The sensing element is similar to that shown in U.S. Pat. No. 3,153,342, assigned to the assignee of the present invention, which utilizes a helical resistance winding and which is employed as a continuous level sensor.

It will be appreciated that the helical turns of wire 38 provide electrically parallel redundant contacts to effectively provide an extremely sensitive distributed switch especially adapted for actuation under severe environmental conditions. Base strip 34 acts as one electrical terminal of the unique detector, while wire 38 serves as the other electrical terminal therefor. A strip of insulative material 40, for example Mylar, is provided on one end of sensing element 12 between base strip 34 and the helical turns of wire 38. Strip 40 is of a width substantially equal to the width of base strip 34 and serves to insulate the base strip from the confronting turns of wire 38 to provide a means of electrical connection to the sensing element.

Electrical connection to wire 38 is provided by means of a conductive braid 42, disposed for example over and under a selected number of turns of wire 38 and which can be soldered or otherwise electrically connected such as at 41 to one or more turns of wire 38. The free end of conductive braid 42 is soldered or otherwise connected to one lead wire of the detector while a second lead wire is connected to an end of base strip 34. A jacket 44 is provided over the electrical system of sensing element 12 and extends along the full length thereof. A seal 46 is provided around the distal end of sensing element 12 to prevent entry of moisture or other contaminants within protective jacket 44. The sensor jacket 44 can include one or more layers of material for providing moisture, abrasion, or chemical resistance, as required in particular operating environments, and serves to seal the inner electrical system from the operating environment as well as providing mechanical resistance to adverse environmental conditions.

A capillary breathing tube 48 is provided within mounting collar 14 with one end thereof disposed within and connected to sensor jacket 46, the other end terminating at the inclined end of collar 14 disposed within the storage vessel. Tube 48 typically is filled at its open end with a fiberglass filter 49 which serves to permit communication between the interior of sensing element 12 and the interior of the storage vessel to prevent differential pressure from interfering with the sensitivity of the detector, while preventing contaminants which may be present within the storage vessel from entering the inner electrical system of sensing element 12. It is not necessary that the sensor communicate with the operating environment. For many purposes, the sensor can be completely closed to the environment, with the internal sensor volume being sufficient to prevent internal pressure from materially affecting sensor performance.

As illustrated in FIG. 1, the detector is disposed in the sidewall of a storage vessel and is disposed substantially horizontally therein. In the absence of material within the storage vessel surrounding sensing element 12, the detector remains inactivated. When, however, stored material surrounds sensing element 12, the surrounding pressure of the stored material causes actuation of the detector by depressing one or more turns of the helical wire into contact with the confronting base strip, as described hereinabove, to provide detector actuation and corresponding indication of the existence of material at the detector location. Sensing element 12 is mechanically resilient in a direction parallel to the longitudinal axis of the storage vessel and is able to withstand shearing forces along this axis, which may be of considerable magnitude and which are often encountered during filling or removal of material from a storage vessel. In some instances it may be desirable to install sensing element 12 at an inclined disposition, such as illustrated in dotted outline in FIG. 1, to provide further resilience to shearing forces encountered. This inclined disposition is particularly useful for example when employed with solid particulate materials, having relatively high abrasive and frictional characteristics, to assist in the flow of such materials past the sensing element without adverse effect on detector operation.

Incorporation of the invention into a storage bin is illustrated in FIG. 3 which shows a first discrete level detector disposed near the top of a vertical storage bin 52 for providing high level indication, a discrete detector 54 near the bottom portion of the bin 52 for providing low level indication, and a third detector 56 disposed within the exit funnel 58 of the storage bin to activate a low level alarm. The detectors 50, 54 and 56 are connected to suitable utilization circuitry which for example may provide alarm indications when the high level detector 50 is activated to indicate an overload condition, and a low level indication upon actuation of detector 54 to denote that refilling of bin 52 should be made. Actuation of detector 56 can activate a low level alarm and can initiate refilling of the vessel.

The detector can also be mounted vertically within a storage vessel as shown by detector 51 in FIG. 3 mounted on the top wall of vessel 52. Since the detector is responsive to and is actuated by the surrounding pressure of the material mass in the vessel, it provides a simple and effective upper level sensor. It is not necessary that the detector be resiliently mounted, although such resilience is of great benefit in many instances, but the detector can be supported within a rigid channel as illustrated in FIG. 4. The detector and its supporting channel are secured at one end to a mounting adapted to provide vertical or angular attachment to a storage vessel. The mounting is a standard pipe component and permits easy installation of the invention in tanks, bins and the like using readily available hardware.

The sensor 130 is supported within an elongated channel 132 (FIG. 5) typically formed of metal. The upper end of the sensor and its mounting channel is secured within a cylindrical collar 134 having threaded end portions 136 and 137. Threaded portion 136 is adapted to mate with a corresponding threaded fitting on a storage vessel, while portion 137 can accommodate a suitable receptacle for electrical connection.

The mounting channel 132 is maintained within collar 134 by means of a pin 138 provided through the walls of collar 134 and through channel 132 and sensor 130. The sensor is further supported within the collar 130 by a suitable potting compound 140 such as an epoxy. A disc 142 is attached within collar 134 adjacent the upper end of channel 132, while a second disc 144 is attached within collar 134 at the upper end thereof. A vent tube 146 is disposed in the manner shown within collar 134 and communicates at its lower end with the working environment of the sensor, and at its upper end with the space between the discs 142 and 144.

A tube 148 has an end inserted within the jacket being sealed to the tube such that the interior of sensor 130 communicates with the working atmosphere only through tube 148. The lower end of the sensor is appropriately sealed from the working atmosphere. A bag 150 formed, for example, of polypropylene is heat sealed or otherwise secured to the upper end of tube 148, the bag being disposed within the upper portion of collar 134 between discs 142 and 144. Bag 150 functions as a closed breathing system and is of sufficient volume to accommodate for pressure variations which occur during normal sensor operation. A major advantage of the closed breathing system is that the sensor can be completely immersed within a liquid or other fluent material being sensed without affect on sensor performance. A pair of lead wires 152 is provided as illustrated and are respectively connected to the conductive base strip and helical winding of sensor 130. Connection of the detector to utilization means can be made to suit particular requirements.

It is a particular feature of the invention that the discrete level detector can be fabricated as a substantially continuous element to provide a plurality of actuation zones for providing zone level indication and control along the entire length of the sensing element. One such multi-zoned detector is illustrated schematically in FIG. 6 and includes an elongated sensing element 60 which comprises a conductive base strip 62 and a helically wound conductive wire depicted diagrammatically by winding 64. Sensing element 60 is vertically disposed within a storage vessel and is freely suspended from a mounting cap 66. A weight 68 may be provided on the lower end of sensing element 60 for stabilizing the vertical disposition of the detector. The sensing element is easily fabricated by helically winding wire 64 around base strip 62 and the interposed insulation, the winding being cut at selected positions, designated X, along the length thereof to provide individual helical windings, each operative to provide a discrete actuation zone. Electrical connection is made to the respective helical windings by respective lead wires which can be disposed along the length of sensing element 60 on the side opposite to the actuation surface. In FIG. 6, lead wires 70a, 70b, 70c and 70d are connected to respective winding zones 64a, 64b, 64c and 64d. All lead wires pass through the mounting cap 66 and typically terminate at a position outside of the storage vessel for connection to appropriate utilization circuitry. A lead wire 72 is connected to conductive base strip 62 to provide a common terminal for each winding of the multiple zone detector. The winding 64 is insulated from base strip 62 by an insulative strip 63 disposed therebetween, except at portions 65 within the length of respective discrete windings 64a – 64d. These uninsulated portions 65 define an actuation zone for each winding wherein each winding can be actuated by the pressure of a surrounding medium.

Connection of a lead wire to respective winding zones of the elongated detector can be accomplished for example in a similar manner as shown in FIG. 2. A flexible conductive braid is secured under a plurality of turns of winding 64, with lead wire 70 connected to one end of the braid, for example by soldering. Alternatively, the lead wire can be soldered directly to one or more turns of winding 64.

The multi-zone sensor is further depicted in FIG. 7. Helical winding 88 has been broken at points 90 and 92 to provide separate discrete detectors 82, 84 and 86, only a portion of detectors 82 and 86 being illustrated. The active actuation zone of each discrete detector such as zone 85 of winding 84, is defined by strips of insulative material 94 disposed between the turns of helical winding 88 and the underlying conductive base strip.

An alternative embodiment of a multiple zone discrete level detector is illustrated in FIG. 8 and includes a plurality of horizontally or angularly disposed sensing elements connected to and supported by a freely hanging vertically disposed support strip. Referring to FIG. 8, there is shown a vertically disposed conductive strip 96 depending from and insulated from a mounting cap 98 and having a stabilizing weight 100 provided on the lower end thereof. A plurality of horizontally disposed elongated sensing elements 102 is supported by strip 96 and each is spaced along the length thereof at selected intervals to provide discrete level indicating positions for actuation by the pressure of a surrounding stored material. The base strip of respective sensing elements 102 is electrically connected to conductive strip 96 which, in turn, is connected to a common lead wire 104. Respective lead wires 106 are connected to the helical actuation winding of sensing elements 102 to provide individual electrical connection to respective discrete detectors.

Construction of an individual sensing element 102 is illustrated more clearly in FIGS. 9 and 10. The base strip 108 of sensing element 102 is mechanically joined to vertical conductive strip 96, for example, by means of a hollow rivet 110 provided near the upper end of base strip 108 and by a winding of tape 112 wound around strips 108 and 96 near the bend in strip 108. A strip 114 of insulative material such as Mylar is disposed between a portion of conductive winding 116 and the underlying conductive base strip 108 and extends beneath tape 112 to a position near hollow rivet 110. Electrical connection is made to winding 116 by a wire braid 118 interposed between the turns of the winding and extending part way onto underlying insulative strip 114. A lead wire 120 disposed along the back side of strip 96 passes through hollow rivet 110 and is soldered or otherwise connected to the conductive braid 118.

As described hereinabove, an activation zone 122 is defined by the insulative strip 114 and a second insulative strip 124 provided at the distal end of the sensing element between the conductive base strip and the confronting turns of the helical winding 116. A protective jacket 126 is provided over the electrical system for isolation thereof from the working environment, as described. In this embodiment, pressure differentials which may exist between the sensor interior and the working environment are accommodated by capillary breathing tube 128 disposed at the distal end of the sensing element and communicating between the sensor interior and the ambient environment.

The detector can be connected to any known utilization circuitry to suit particular operating requirements. In general, the detector leads are connected to a relay which is operative upon actuation of the detector, the relay contacts being employed to activate particular utilization circuitry.

Various modifications and alternative implementations will occur to those versed in the art and it is not intended to limit the invention by what has been particularly shown and described.

What is claimed is:

1. A level detector comprising:
   an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, the portions of conductive wire bridging said insulation means acting as electrically parallel redundant contacts;
   a flexible jacket enclosing said base strip, said insulation means and said conductive wire;
   means electrically connected to said base strip and said conductive wire and adapted for connection to utilization means; and
   means attached to one end of said detector for mounting said detector to a storage vessel in a position to sense the presence of surrounding material therein;
   said detector being responsive to the pressure of surrounding material to cause contact of one or more turns of said helical wire with said conductive base strip thereby to indicate the presence of material at the detector position;
   and wherein said mounting means includes
   a cylindrical pipe fitting disposed around one end of said detector and rigidly secured thereto;
   sealing means provided on the distal end of said detector for sealing said distal end from the working environment;
   a closed breathing system including a tube having one end disposed within the interior of said detector and an opposite end secured to a bag disposed within said fitting; and
   a vent tube disposed within said fitting and communicating between the upper portion thereof and the working environment of said detector.

2. A level detector according to claim 1 further including a rigid channel substantially coextensive with and supporting said detector and having an end portion rigidly secured within said fitting.

3. A level detector for detecting the level of material at distinct zones along the length thereof, said detector comprising:
   a plurality of distinct detectors each including an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, the portions of conductive wire bridging said insulation means acting as electrically parallel redundant contacts;
   a flexible jacket enclosing said base strip, said insulation means and said conductive wire;
   an elongated conductive support strip adapted for vertical disposition within a storage vessel;
   each of said distinct detectors being connected to said conductive support strip at selected intervals along the length thereof with the conductive base strip of each of said distinct detectors being electrically attached to said conductive support strip;
   each of said distinct detectors being disposed in angular relation to said conductive support strip; and
   means respectively connected to the helically wound wire of each of said distinct detectors for providing respective electrical connection to each of said distinct detectors, said conductive support strip providing a common electrical connection for all of said distinct detectors.

4. A level detector according to claim 3 including a plurality of vent tubes each attached to the distal end of a respective distinct detector and each communicating between the interior of its detector and the working environment.

5. A level detector comprising:
   an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, the portions of conductive wire bridging said insulation means acting as electrically parallel redundant contacts;
   a flexible jacket enclosing said base strip, said insulation means and said conductive wire;
   means electrically connected to said base strip and said conductive wire and adapted for connection to utilization means; and
   means attached to one end of said detector for mounting said detector to a storage vessel in a substantially horizontal position therein to sense the presence of surrounding material therein;
   said detector being responsive to the presence of surrounding material to cause contact of one or more turns of said helical wire with said conductive base strip thereby to indicate the presence of material at the detector position.

6. A level detector comprising:
   an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, the portions of conductive wire bridging said insulation means acting as electrically parallel redundant contacts;
   a flexible jacket enclosing said base strip, said insulation means and said conductive wire;
   means electrically connected to said base strip and said conductive wire and adapted for connection to utilization means; and
   means attached to one end of said detector for mounting said detector to a storage vessel in an inclined position therein to sense the presence of surrounding material therein;
   said detector being responsive to the presence of surrounding material to cause contact of one or more turns of said helical wire with said conductive base strip thereby to indicate the presence of material at the detector position.

7. A level detector for detecting the presence of material at distinct zones along the length thereof, said detector comprising:
   an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, said helical wire being severed at selected points along the length thereof to provide a plurality of distinct helical coils;
   a plurality of electrical leads each lead being connected to a respective coil;
   an electrical lead connected to said base strip;
   said leads being adapted for connection to utilization circuitry;
   insulation means disposed between said helically wound wire and said conductive base strip at selected portions along the length of said detector to define at regions between adjacent insulation means distinct active zones;
   a flexible jacket enclosing said base strip said insulation means and said wire; and
   means for mounting said detector to a storage vessel in a vertical position to sense the presence of surrounding material therein;
   said detector being responsive to the pressure of surrounding material to cause contact of one or more turns of said helical wire with said conductive base strip, the actuation of a selected helical coil indicating the presence of material at the detector zone defined by that coil position.

8. A level detector comprising:
   an elongated electrically conductive base strip;
   electrical insulation means disposed around and insulating said base strip with the exception of a full length exposed portion on one side thereof;
   an electrically conductive wire helically wound around said base strip and insulated therefrom by said insulation means, the portions of conductive wire bridging said insulation means acting as electrically parallel redundant contacts;
   a flexible jacket enclosing said base strip, said insulation means and said conductive wire;
   means electrically connected to said base strip and said conductive wire and adapted for connection to utilization means; and means attached to one end of said detector for mounting said detector to a storage vessel in a position to sense the presence of surrounding material therein;

said detector being responsive to the presence of surrounding material to cause contact of one or more turns of said helical wire with said conductive base strip thereby to indicate the presence of material at the detector position;

and wherein said mounting means includes a collar attached to and supporting said detector on one end thereof;

a capillary breathing tube including a filler therein disposed within said collar and communicating between the interior of said detector and the working environment;

sealing means provided on the distal end of said detector for sealing said distal end from said environment;

and wherein said electrical connection means includes a conductive braid electrically and mechanically connected to one or more turns of said conductive wire at the mounting end of said detector;

insulation means disposed between said wire and said conductive base strip for insulating said conductive braid from said base strip;

a first lead wire having one end connected to said conductive braid and an opposite end adapted for connection to utilization means; and a second lead wire having one end connected to said conductive base strip and an opposite end adapted for connection to said utilization means.

9. A level detector comprising:

an elongated electrically conductive base strip;

electrical insulation means disposed around and insulating said base strip with the exception of a full length exposed portion on one side thereof;

an electrically conductive wire helically wound around said base strip and insulated therefrom by said insulation means, the portions of conductive wire bridging said insulation means acting as electrically parallel redundant contacts;

a flexible jacket enclosing said base strip, said insulation means and said conductive wire;

means electrically connected to said base strip and said conductive wire and adapted for connection to utilization means; and means attached to one end of said detector for mounting said detector to a storage vessel in a position to sense the presence of surrounding material therein;

said detector being responsive to the pressure of surrounding material to cause contact of one or more turns of said helical wire with said conductive base strip thereby to indicate the presence of material at the detector position;

and wherein said mounting means includes a cylindrical pipe fitting disposed around one end of said detector and rigidly secured thereto;

sealing means provided on the distal end of said detector for sealing said distal end from the working environment;

a closed breathing system including a tube having one end disposed within the interior of said detector and an opposite end secured to a container disposed within said fitting; and a vent tube disposed within said fitting and communicating between the upper portion thereof and the working environment of said detector.

* * * * *